United States Patent [19]

Yabor

[11] Patent Number: 4,901,747
[45] Date of Patent: Feb. 20, 1990

[54] TIRE INFLATION VALVE WITH PRESSURE INDICATOR

[75] Inventor: Enrique M. Yabor, Miami, Fla.

[73] Assignee: David Moliver, Miami, Fla. ; a part interest

[21] Appl. No.: 212,907

[22] Filed: Jun. 29, 1988

[51] Int. Cl.⁴ .................. F16K 37/00; B60C 23/00
[52] U.S. Cl. .................. 137/227; 73/146.8; 116/34 R; 152/427
[58] Field of Search .......... 137/227; 116/34 R; 73/146.3, 146.8; 152/427, DIG. 11

[56] References Cited

U.S. PATENT DOCUMENTS

| | | | |
|---|---|---|---|
| 1,803,270 | 4/1931 | Morrison | 137/227 |
| 2,481,142 | 9/1949 | Mueller et al. | 152/DIG. 11 X |
| 3,670,688 | 6/1972 | Seaberg | 137/227 X |
| 3,789,867 | 2/1974 | Yabor | 137/227 |
| 3,792,677 | 2/1974 | Frost | 116/34 R |
| 3,866,563 | 2/1975 | Bluem | 116/34 R |
| 3,906,988 | 9/1975 | Mottram | 73/146.3 X |
| 4,072,048 | 2/1978 | Arvan | 73/146.8 |

Primary Examiner—John Rivell
Attorney, Agent, or Firm—Fleit, Jacobson, Cohn, Price, Holman & Stern

[57] ABSTRACT

A tire valve with a tire air pressure indicator incorporated therein to provide a continuous visual indication of the air pressure within the tire. The tire valve includes a rigid tubular main stem having means on its inner end for mounting on a tire rim together with an external sleeve spaced from and sealingly engaged with the main stem to form an air chamber. A spring biased piston is slidably disposed in the air chamber for movement longitudinally therein with air passages communicating the interior of the stem with the air chamber with the air pressure in the tire also occurring in the air chamber thereby moving the piston outwardly by compressing a calibrated spring in accordance with the air pressure. The external sleeve is transparent and the piston serves as an indicator associated with a graduated scale on the sleeve to indicate the air pressure in the tire.

4 Claims, 1 Drawing Sheet

TIRE INFLATION VALVE WITH PRESSURE INDICATOR

BACKGROUND OF THE INVENTION

Field of the Invention

The present invention generally relates to a tire valve such as those used in association with a tubeless tire and rim. The tire valve includes a tire air pressure indicator incorporated therein to provide a continuous visual indication of the air pressure within the tire. The tire valve includes a rigid tubular main stem having means on its inner end for mounting on a tire rim together with an external sleeve spaced from and sealingly engaged with the main stem to form an air chamber. A spring biased piston is slidably disposed in the air chamber for movement longitudinally therein with air passages communicating the interior of the stem with the air chamber with the air pressure in the tire also occurring in the air chamber thereby moving the piston outwardly by compressing a calibrated spring in accordance with the air pressure. The external sleeve is transparent and the piston serves as an indicator associated with a graduated scale on the sleeve to indicate the air pressure in the tire.

INFORMATION DISCLOSURE STATEMENT

Prior U.S. Pat. No. 3,789,867 issued Feb. 5, 1974, for Tire Inflation Valve With Pressure Indicator incorporates the concept of providing an air pressure indicator on each tire valve so that the pressure within the tire will always be indicated by the air pressure indicator. In this construction, the tire valve includes an air chamber that communicates with the interior of the tire valve and the interior of the vehicle tire by the provision of air passages which extend axially into a passageway that extends through the base of the tire valve for communication with the interior of the tire.

SUMMARY OF THE INVENTION

An object of the present invention is to provide a tire valve with a pressure indicator incorporated therein which can be provided with various types of mounting structures for securing the air valve to the rim with the air valve including an air chamber oriented exteriorly thereof with radial air passageways communicating the chamber with the interior of the tire valve so that the base or mounting structure for the tire valve need not be altered in order for the air pressure indicating structure to function.

Another object of the invention is to provide a tire valve with pressure indicator incorporated therein in which the valve includes a hollow or tubular main stem having flange structures adjacent the inner end thereof for embedment in or securement to or engagement by a mounting structure for mounting the stem on a tire rim.

A further object of the invention is provide a tire valve with pressure indicator in which the air chamber is disposed externally of the main stem and communicated therewith by radial air passages oriented above the inner flange on the main stem.

Still another object of the invention is to provide an air valve with pressure indicator in accordance with the preceding objects in which the components are readily assembled and disassembled to facilitate manufacturing and assembly with the air valve including various alternative mounting structures for securing the air valve to the rim.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
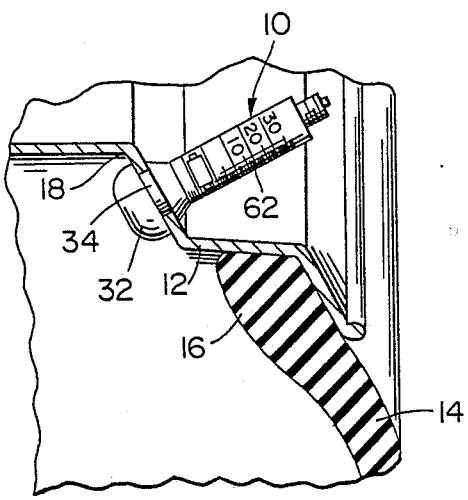
FIG. 1 is a sectional view of a tire, rim and an elevational view of the air valve with pressure indicator illustrating the manner in which the present invention is installed on a conventional rim.

Referring now specifically to the drawings, the air valve with pressure indicator of the present invention is generally designated by reference numeral 10 and, in FIG. 1, is mounted on a tire rim 12 having a tubeless tire 14 mounted thereon with the tire bead 16 associated with the rim in a conventional manner. The rim 12 includes an opening 18 incorporated therein through which the tire valve 10 is mounted in a conventional manner as set forth hereinafter. The tire valve with pressure indicator 10 can be installed in exactly the same manner as conventional tire valves and will enable inflation and deflation of the tire in the same manner but will include a pressure indicator to indicate the air pressure within the tire 14.

The tire valve with pressure indicator 10 includes a rigid tubular main stem 20 that includes a longitudinally extending bore 22 extending throughout the length thereof with the outer end of the bore 22 being internally threaded as at 24 to removably receive a valve assembly 26 which may be in the form of a conventional Schrader inflation valve which forms no particular part of the present invention since it is conventional, but it is mounted in the tubular main stem 20 in exactly the same manner that it is normally mounted in a tire inflation valve.

Figure 2:
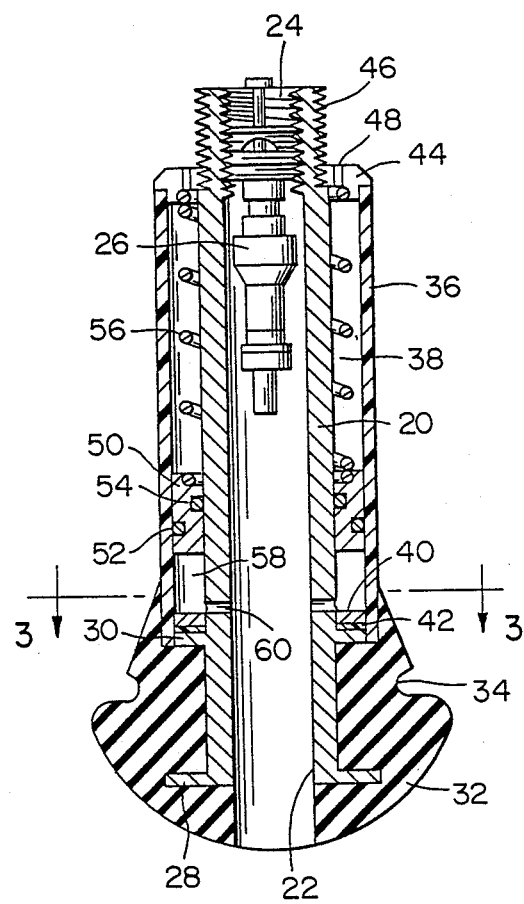
FIG. 2 is an enlarged longitudinal sectional view of the air valve with pressure indicator.
Figure 3:
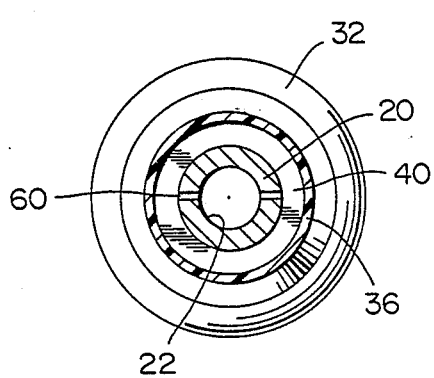
FIG. 3 is a transverse, sectional view taken substantially upon a plane passing on section line 3—3 on FIG. 2 illustrating further structural details of the invention.

The main stem 20 includes a peripheral flange 28 at its lower end which extends outwardly and a second peripheral flange 30 spaced upwardly therefrom as illustrated in FIG. 2 with these flanges being rigid and integral with the main stem 20. A resilient base of rubber or similar resilient material is designated by the numeral 32 and includes a peripheral groove 34 which sealingly engages the periphery of the opening 18 in the rim 12 in a manner exactly the same as a conventional tire valve. Mounted exteriorly of the main stem 20 is a sleeve or cylinder 36 which is spaced circumferentially and concentrically of the main stem 20, thus defining an annular space 38 which extends throughout the length of the sleeve or cylinder 36. The lower end of the sleeve 36 includes an inwardly extending flange 40 which is spaced upwardly slightly from the lower end of the sleeve 36 to form a seat for engagement with the flange 30 on the main stem 20 with a sealing gasket 42 being positioned between the flange 40 and the flange 30 to provide an air-tight seal. The upper end of the sleeve or cylinder 36 is closed by a cap 44 which is screw threaded onto the externally threaded upper end portion 46 of the main stem 20 so that the cap will force the sleeve 36 downwardly into sealing engagement with the flange 30. The cap 44 is provided with vent openings 48 extending therethrough which communicate the upper end of the space 38 with the atmosphere.

Slidably disposed and sealingly engaged with the exterior of the main stem 20 and the interior of the sleeve 36 is a pressure indicating piston 50 which has an external O-ring 52 sealingly engaging the interior of the sleeve 36 and an interior O-ring 54 sealingly engaging the exterior of the main stem 20. The piston 50 is slidable in the space 38 and a coil compression spring 56 is interposed between the piston 50 and the cap 44 thus spring biasing the piston downwardly to a normal position above the lower end of the annular space 38 so that the space between the piston 50 and the flange 40 forms an air chamber 58 that communicates with the interior of the main stem 20 through radial air passageways 60 which are located immediately above the flange 40. With this arrangement, the air passageways 60 are disposed axially inwardly of the valve 26 and communicate the bore 22 and thus the air pressure in the tire with the air chamber 58 thus biasing the piston 50 outwardly against the calibrated spring 56. The sleeve or cylinder 36 is constructed of transparent material such as high impact plastic and the piston 50 is constructed so that it is readily visible and may be of a distinguishable color so that the piston 50 will register with a graduated scale 62 on the exterior or incorporated into the transparent sleeve 36 with the graduated scale 62 including numerical indicia associated therewith to indicate the tire pressure. The tire pressure indicated is the air pressure within the tire which is an unknown pressure exerting outward force on the piston 50 against the spring 56 thus moving the piston outwardly a distance corresponding to the air pressure within the tire thereby providing a visual indication of the air pressure within the tire.

Figure 4:
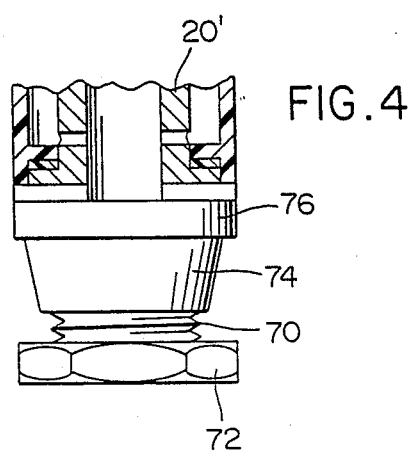
FIG. 4 is a fragmental sectional view illustrating a mounting structure for the main stem incorporating a seal and lock nut arrangement.

FIG. 4 illustrates a modified form of the invention in which the structural components are the same except that the lower end of the main stem 20' is externally threaded as at 70 to receive a retaining nut 72 thereon. Positioned on the threaded portion 70 of the stem 20' is a seal 74 having an upper flange 76 and a downwardly and inwardly tapering body that will be associated with the opening 18 in the rim 12 with the lock nut 72 being used to tightly clamp the seal 74 in sealing relation to the opening 18.

Figure 5:
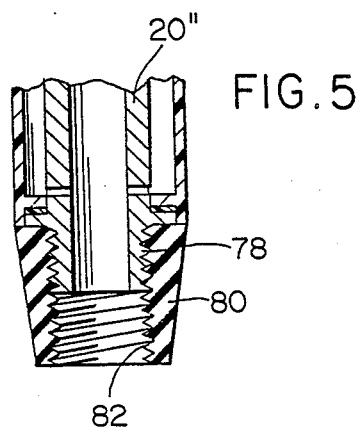
FIG. 5 is a fragmental sectional view similar to FIG. 4 illustrating another type of screw on mounting structure.

FIG. 5 illustrates another slight modification of the invention in which the bore end of the main stem 20" is also externally threaded as at 78, but in this embodiment of the invention, the seal is in the form of a screw-on adaptor 80 which is internally threaded at 82 so that the upper end of the seal 80 will abut the flange 30 at the lower end portion of the main stem 20" for receiving a retaining structure that can be screw threaded into the interiorally threaded seal at 82.

In each embodiment of the invention, the air passageways communicate the interior bore of the tire valve with an air chamber with the pressure in the air chamber forcing the piston 50 upwardly a distance commensurate with the air pressure in the tire with the piston cooperating with the graduated scale 62 and numerical indicia associated therewith to provide a direct visual indication of the tire pressure within the tire at all times thereby enabling the tire pressure to be quickly and accurately ascertained and, if additional tire pressure is needed, the tire may be inflated to maintain safe operating air pressure conditions within the tire.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A tire inflation valve and air pressure indicating device comprising an elongated rigid main stem having an axial bore extending therethrough and open at its respective inner and outer ends, a normally closed tire valve mounted in the outer end portion of said main stem, an external cylindrical sleeve mounted on the main stem in concentrically spaced relation and in sealed relation to the stem, a piston slidably and sealingly mounted in the space between the stem and sleeve, spring means within the sleeve to bias the piston in one direction, an air chamber in the space between the sleeve and stem in communication with the bore through the main stem thereby communicating air pressure in the tire with the air chamber for moving the piston against the spring means, said sleeve being transparent to enable visual observation of the movement of the piston and graduated scale means on the sleeve associated with the piston to indicate air pressure within the tire, said stem including an inner flange, said sleeve having an inner end seated on the flange and a sealing gasket between the inner end of the sleeve and the flange, and air passages extending radially from the interior bore of the stem to the air chamber immediately outwardly of the inner end of the sleeve, said spring means being a calibrated coil spring between the piston and the outer end of the sleeve.

2. The structure as defined in claim 1, wherein the inner end of the main stem is externally threaded and provided with a sealing member having a tapered outer surface thereon and a locking nut engaging the threaded end portion of the stem for securing the stem in sealed relation to an opening in a rim.

3. The structure as defined in claim 1, wherein the inner end of said stem is externally threaded and provided with a screw threaded resilient adaptor thereon for sealing engagement with an opening in a rim.

4. The structure as defined in claim 1, wherein the outer end of the sleeve is closed by a screw threaded cap engaging an externally threaded outer end of the stem, said cap including vent openings venting the space between the stem and sleeve in which the coil spring is disposed.

* * * * *